Dec. 9, 1941.  F. HAMACHEK, JR  2,265,642
ROTARY DRUM SCREEN
Filed March 26, 1938
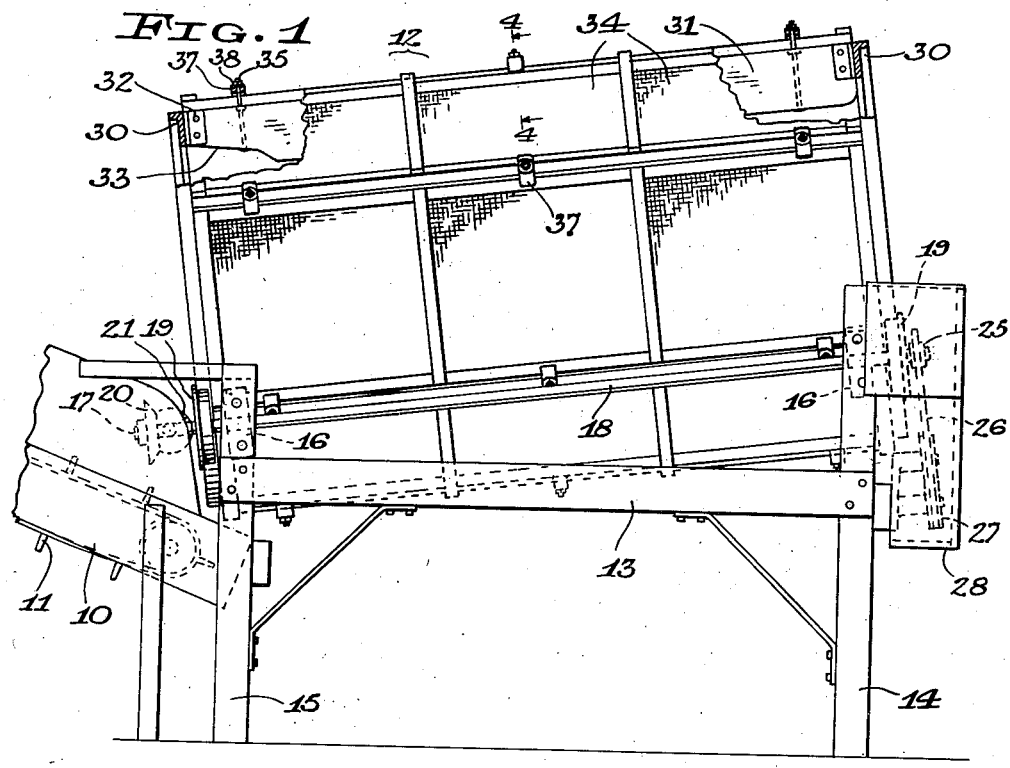
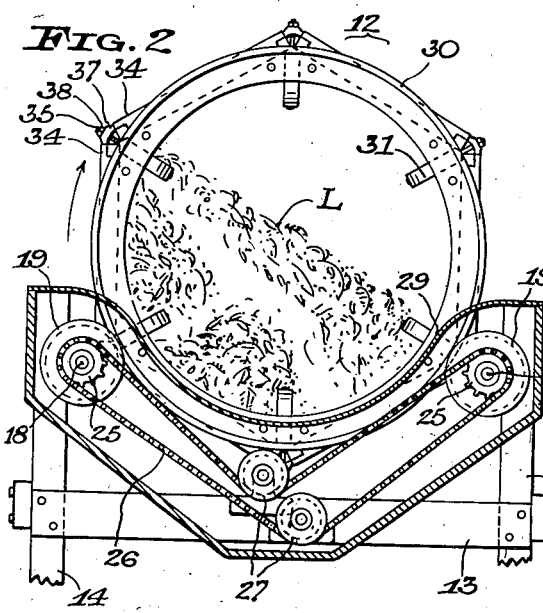
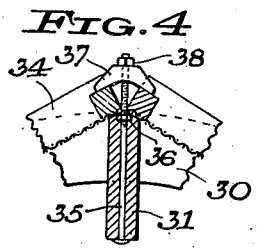
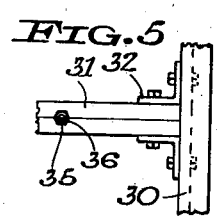
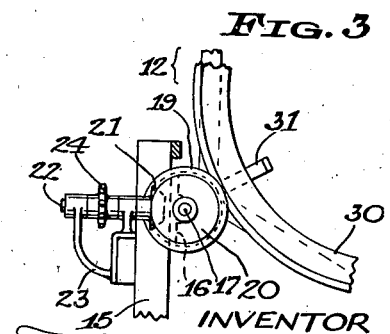
WITNESSES
L. E. Kilian
C. L. Waal
INVENTOR
Frank Hamachek Jr.
By R. H. Caldwell
ATTORNEY Patented Dec. 9, 1941

2,265,642

UNITED STATES PATENT OFFICE 2,265,642

ROTARY DRUM SCREEN

Frank Hamachek, Jr., Kewaunee, Wis., assignor to Frank Hamachek Machine Company, Kewaunee, Wis., a corporation of Wisconsin Application March 26, 1938, Serial No. 198,193

1 Claim. (Cl. 209—411)

The invention relates to a method and machine for cleaning lima bean vines and the like preparatory to threshing.

Lima beans when grown for canning purposes are sown in rows and cultivated. When the beans reach a suitable stage of maturity for canning, the vines or bushes may be pulled out by hand, but in most cases they are harvested with a bean plow or puller having long angling knives which cut the vines beneath the ground that has been hilled for cultivation. For practical reasons, it is impossible to keep the knives sufficiently sharp to cut the vines, and as a result most of the vines with their roots are pulled out of the ground by the knives.

In some instances the pod-bearing vines are fed directly into a viner, such as that used for peas, and are threshed or hulled. The large amount of dirt, soil and insects brought from the fields with the vines and weeds is very objectionable as the threshed beans come in contact with the dirt. The dirt makes it nearly impossible for the separating apron of the viner to save all of the beans, and much of the dirt falls into the receptacle for the threshed beans. The dirt also causes excessive wear on the viner parts.

It has heretofore been proposed to separate dirt from lima bean vines or bushes before feeding them into the viner, but the dirt removers or cleaners heretofore devised for this purpose have been open to various objections, such as inefficient operation, tangling of the vines or bushes, and inability to meet different conditions of the crop. It is an object of the invention to provide an improved method, the practice of which will overcome the disadvantages above stated.

It is an object of the present invention to provide an improved rotary machine of simple and durable construction for removing dirt from pod-bearing lima bean vines and the like, the machine being capable of rapid and efficient operation, and being of such character that it will avoid tangling or bunching of the vines and will permit steady feeding of the vines in a thoroughly separated condition into the viner.

Another object of the invention is to provide a rotary dirt remover having sieves or screens which can easily and quickly be removed for cleaning and for substitution of other sieves or screens with larger or smaller openings to meet different crop conditions.

The invention further consists in the several features hereinafter described and claimed.

In the accompanying drawing, illustrating an embodiment of the invention:

Fig. 1 is a side elevation of a rotary dirt remover constructed in accordance with the invention, parts being broken away and parts being shown in section;

Fig. 2 is an elevation of the feeding end of the machine, parts of a drive guard being shown in section;

Fig. 3 is a detail elevation of a portion of the discharge end of the machine, parts being shown in section;

Fig. 4 is a detail sectional view of a portion of the screen drum taken generally along the line 4—4 of Fig. 1, and Fig. 5 is a detail view of an end portion of the drum with the screens removed.

In the drawing, 10 designates the feeder of a viner, the viner and its feeder being of any usual construction, and the feeder having the customary fingered feeding conveyor 11.

The dirt remover of the invention comprises an approximately horizontal screen drum 12 rotatably supported on a stationary frame 13, the drum having opposite open feeding and discharge ends the latter of which is adjacent to the viner feeder.

The frame 13 includes pairs of front and rear uprights 14 and 15 rigidly connected together, it being usually unnecessary to fasten the frame to the viner feeder 10. Bearing brackets 16 are secured to the inner faces of the upper ends of the uprights 14 and 15 and have journalled therein a pair of parallel shafts 17 and 18, one at each side of the frame. Each shaft carries flanged rollers 19 thereon at its opposite ends to rotatably support and drive the screen drum 12, the rollers being well spaced to insure stable support of the drum. The end of the shaft 17 adjacent to the discharge end of the drum carries a bevel gear 20 meshing with a bevel gear 21 on a shaft 22, Fig. 3. The shaft 22 is journalled in a bearing bracket 23 secured to the frame 13, and carries a sprocket wheel 24 adapted to be chain-driven from any suitable source of power, such as a power take-off shaft (not shown) carried on the viner. The front ends of the shafts 17 and 18 are at a higher elevation than the bottom of the feeding opening of the screen drum 12 and carry sprocket wheels 25 which are connected by a chain 26 for driving the shaft 18 from the shaft 17. The intermediate portions of the runs of the chain 26 are depressed by passing them under flanged idler pulleys 27 rotatably mounted on the front portion of the frame, thus avoiding obstruction of the open feeding end of the screen drum 12. The chain drive between the shafts is enclosed by a guard 28 which is suitably secured to the frame of the machine. The guard has a concave top wall 29 concentric with the screen drum and arranged near the periphery of the drum so as to form a shelf and to avoid obstruction of the open feeding end of the drum.

The screen drum includes peripherally flanged metal end rings 30 which ride on the rollers 19 and are frictionally driven thereby. The end rings are connected by a plurality of longitudinal lifting bars or ribs 31 to form a rotatable cage or skeleton frame. Six bars are indicated in the present instance and are rigidly secured to the end rings in any suitable manner, as by bolted clip angles 32. The planes of the bars extend substantialy radially of the drum, each bar having flat parallel side faces extending to the inner or free edge of the bar. If desired, the discharge ends of the bars may be cut away at their inner edges, as indicated at 33 in Fig. 1. A plurality of flat rectangular framed sieves or screens 34 extend between the end rings and have their side edges resting on the outer edges of the lifting bars 31, as best seen in Fig. 4. Bolts 35 extend radially through the bars and are secured thereto by nuts 36, Fig. 4, the outer ends of the bolts passing between adjacent screens. Apertured clamping bars or yokes 37 are mounted on the bolts to engage the adjacent side edges of the screens and are detachably secured in place by nuts 38 on the bolts. The screen drum thus formed is of polyhedral shape and polygonal cross-section. The drum is here indicated to have its discharge end slightly lower than its feeding end in order to cause the vines to feed through the drum, but this through feeding may be accomplished in other ways, as by skewing the lifting bars. The interior space of the drum, including the axial region thereof, is entirely open and unobstructed so that the vines, after being elevated by the lifting ribs, may fall freely from one peripheral wall of the drum to the opposite wall, as hereinafter described.

In operation, the screen drum is driven in either direction at a suitable rate of speed by the supporting rollers 19, a clockwise direction being indicated in Fig. 2. The lima bean vines or bushes, indicated at L, are fed into the open feeding end of the drum, preferably in as steady a stream as possible. This feeding is generally accomplished by means of a pitchfork, the large feeding opening of the drum minimizing danger of striking the drum. The pod-bearing vines are elevated by the lifting bars 31 on the rising side of the drum to a position somewhat above the horizontal, such as the 9:30 or 10:00 o'clock position, whereupon the vines slide off the flat-sided bars by gravity and fall (influenced to some extent by centrifugal force) in an oblique direction onto the lower portion of the descending side of the drum on the other side of the vertical through the drum axis, striking a lifting bar or flat screen, or both, at about the 4:00 or 4:30 o'clock position with sufficient force or impact to shake off a considerable amount of dirt and to break up lumps of dirt, the loosened dirt dropping through the meshes of the screens. The impact, however, is not sufficiently great to open the pods, although some of the pods may break off the vines. The falling vines strike the screen more or less squarely, so as to effectively remove the dirt. The impact area or zone at the lower portion of the descending side of the drum is substantially clear of the vine-loading and supporting area at the bottom of the drum, thus insuring a forcible impact of the falling or projected vines directly against the screen walls and ribs, and permitting relatively free discharge of the dirt through the screen meshes. The vines resting on the bottom area of the drum are substantially out of the impact area, thereby minimizing undesired cushioning and shielding effect on the falling vines, and permitting the machine to be operated at a high capacity. The lifting and falling of the vines is repeated many times as the vines progress through the drum. The cleaned vines are then discharged from the drum onto the viner feeder 10 by which they are conducted to the viner.

The flat-sided screen drum with its lifting bars not only effectively removes the dirt from the vines but also separates and untangles the vines and permits the feeder 10 to feed the vines to the viner in a steady stream and in a well separated condition, so as to insure proper and efficient operation of the viner. Because of the relatively clean condition of the vines when they enter the viner, the threshed lima beans will be free from dirt and the viner will not be subject to excessive wear or to frequent stoppages.

The screens 34 can be quickly and easily removed for cleaning, or for substituting other screens having openings of different size. Different varieties of lima beans are canned and the sizes of the pods vary, although most of the beans are of the Henderson Bush variety. The openings of the screens should be as large as possible without permitting the pods to fall through. During some seasons and under some growing conditions the stems by which the pods are attached to the vines or bushes become very brittle, causing the pods to break off quite easily. Consequently it is economical in many cases to have more than one set of screens for a machine.

The narrowed ends of the lifting bars at the discharge end of the drum serve to reduce the lifting effect at this region, so that the vine material will be discharged from the drum at the lowest portion of the drum. The cut-away end portions of the lifting bars are adjacent the inner periphery of the end ring 30 at the discharge end of the drum, so as to permit relatively free discharge of the vine material.

What I claim as new and desire to secure by Letters Patent is:

In a machine for removing dirt from lima bean vines and the like, a rotatable centrally open agitating drum through which the vines are fed and having screen walls to permit the escape of dirt, said drum having feeding and discharge openings at opposite ends, a pair of rotatably mounted shafts extending longitudinally of said drum adjacent to the opposite sides of said drum and each having axially spaced rollers for supporting and rotating said drum, means for driving one of said shafts at the end thereof adjacent to the discharge end of said drum, a transmission chain connecting the ends of said shafts adjacent to the feeding end of said drum to drive the second shaft from said first shaft, said chain-connected shaft ends being at a higher elevation than the bottom of the feeding opening of said drum, and said chain having a depressed intermediate portion to avoid obstruction of said opening, and idlers supporting said depressed intermediate portion of the chain.

FRANK HAMACHEK, Jr.